(12) United States Patent
Pereira

(10) Patent No.: US 7,379,407 B2
(45) Date of Patent: May 27, 2008

(54) METHOD AND SYSTEM FOR OPTICAL DRIVE WRITE STRATEGIES EMBEDDED IN AN OPTICAL MEDIUM

(75) Inventor: David M. Pereira, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/564,913

(22) Filed: Nov. 30, 2006

(65) Prior Publication Data

US 2007/0086300 A1 Apr. 19, 2007

Related U.S. Application Data

(63) Continuation of application No. 10/421,418, filed on Apr. 23, 2003, now Pat. No. 7,161,881.

(51) Int. Cl.
*G11B 5/09* (2006.01)
*G11B 7/0045* (2006.01)

(52) U.S. Cl. .................... 369/59.11; 369/47.53
(58) Field of Classification Search ...................... None
See application file for complete search history.

(56) References Cited

U.S. PATENT DOCUMENTS

| 6,154,437 | A | 11/2000 | Utsunomiya et al. .... 369/275.2 |
| 6,407,976 | B2 | 6/2002 | Nagara et al. ............... 369/116 |
| 6,445,669 | B1 | 9/2002 | Hattori et al. ............... 369/116 |
| 6,469,968 | B1 | 10/2002 | Van Den Enden et al. ......................... 369/59.12 |
| 6,996,047 | B2* | 2/2006 | Nagano .................... 369/59.11 |
| 7,038,982 | B2* | 5/2006 | Schreurs et al. ......... 369/47.53 |
| 7,068,579 | B2* | 6/2006 | Tasaka et al. ............. 369/59.24 |
| 2003/0021201 | A1* | 1/2003 | Kobayashi ................ 369/47.39 |
| 2003/0058767 | A1* | 3/2003 | Han et al. ................... 369/53.2 |
| 2004/0145985 | A1* | 7/2004 | Osakabe ................... 369/47.53 |

\* cited by examiner

*Primary Examiner*—William Korzuch
*Assistant Examiner*—Peter Vincent Agustin
(74) *Attorney, Agent, or Firm*—Hamilton & Terrile, LLP; Robert W. Holland

(57) ABSTRACT

An optical drive writes information to an optical medium by obtaining a write strategy for the optical medium from a write strategy table embedded in the optical medium. A write module in the optical drive reads an optical drive identification code from the optical medium to select a write strategy associated with the optical drive. The write strategy of the embedded write strategy table that is identified for the optical drive is retrieved by the write module to write information to the optical medium with the optical drive using the identified write strategy. In one embodiment, a time stamp of the identified write strategy retrieved from the optical medium is compared with a time stamp of a write strategy already available to the optical drive to select the most recent write strategy for use by the optical drive. The write strategy table is embedded in the optical medium at manufacture of the optical medium, such as by stamping or burning the data into the optical material of the optical medium.

6 Claims, 2 Drawing Sheets

METHOD AND SYSTEM FOR OPTICAL DRIVE WRITE STRATEGIES EMBEDDED IN AN OPTICAL MEDIUM

RELATED APPLICATIONS

The present application relates to and incorporates by reference U.S. patent application Ser. No. 10/370,145 filed on Feb. 19, 2003, entitled "Method and System for Setting Optical Drive Write Strategies" and naming David M. Pereira as inventor, the application being incorporated herein by reference in its entirety.

The present application relates to and incorporates by reference U.S. patent application Ser. No. 10/368,792 filed on Feb. 19, 2003, entitled "Method and System for Creating an Optical Drive Write Strategy for an Unknown Optical Media" and naming David M. Pereira as inventor, the application being incorporated herein by reference in its entirety.

This application is a continuation of co-pending application Ser. No. 10/421,418, filed Apr. 23, 2003, now U.S. Pat. No. 7,161,881 entitled "Method and System for Optical Drive Write Strategies Embedded in an Optical Medium" and naming David M. Pereira as inventor, which is hereby incorporated by reference in its entirety.

BACKGROUND OF THE INVENTION

1. Field of the Invention

The present invention relates in general to the field of writing information to optical media, and more particularly to a method and system for embedded optical drive write strategies for writing information to optical media.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An increasingly popular media for storing information is writable and re-writable optical media, such as CD and DVD disks. Greater consumer demand for writable optical media has led to a greater number of manufacturers of writable optical media and an effort by these manufacturers to improve optical media write speeds by developing new variations in dye formulation and manufacturing parameters. Optical drives store information on these optical media by illuminating an optical medium disk with a focused laser beam that alters the reflective properties of the medium. The information is read from the optical medium by illumination of the medium with a lower powered laser and by measuring the reflectivity of the optical medium. Optical drive manufacturers attempt to store information on optical media to meet standards that require write attempts to be reasonably free from errors. In order to have reasonable writing accuracy, optical drive manufacturers often develop separate write strategies for each type of optical medium. A write strategy is a combination of write parameters, such as write laser power, pulse shape, pulse width, etc . . . , that permit the optical drive to write to a disk with an acceptable number of errors. Typically, optical drives identify an inserted disk by type and manufacturer from an identification code embedded on the disk by the manufacturer. The optical drive then selects a write strategy for the disk from a stored list of write strategies and applies the selected write strategy to write the information onto the disk.

One difficulty faced by optical drive manufacturers is maintaining the list of write strategies on an optical drive so that optical media developed after the optical drive is in use can have a write strategy added to the list. Write strategies are typically bundled in drive firmware unseparated from executable code. One solution is for information handling system manufacturers to update optical drive firmware with a current write strategy list immediately before shipping the information handling system to a customer. However, updating a write strategy list generally involves a costly and time consuming re-flash of firmware since changes to executable code must generally be confirmed before shipment, and updating a list at shipment does not address write strategies developed after shipment of the information handling system. Another solution used by optical drive manufacturers is to have a non-optimized generic write strategy available for optical medium disks having an identification code not included in the optical drive write strategy list. However, a generic write strategy typically results in reduced write quality and write speed. Another solution is to post drive firmware with an updated list of write strategies for download to the optical drive, such as at an Internet site, although users generally must know of and access such downloadable firmware and such updates generally require a re-flash of firmware.

SUMMARY OF THE INVENTION

Therefore a need has arisen for a method and system which provides a write strategy for an optical drive to write information to an optical medium if the optical drive's write strategy list lacks a write strategy for the optical medium.

A further need exists for a method and system which supports write strategies not found in optical drive firmware and updates the optical drive's write strategy list in the drive's non-volatile memory with a write strategy provided from the optical medium.

In accordance with the present invention, a method and system are provided which substantially reduce the disadvantages and problems associated with previous methods and systems for writing information to optical media. An optical drive writes information to an optical medium by obtaining the write strategy for writing the information from the optical medium. The optical drive searches the optical medium for an identification code associated with the optical drive to locate a write strategy embedded in the optical medium for writing information to the optical medium.

More specifically, a write module in the optical drive reads an optical medium identification code from an inserted optical medium to locate a built-in write strategy associated with the optical medium identification code that is stored in an optical drive write strategy table. The write module also searches an optical medium write strategy table embedded in the optical medium for an identification code associated with the optical drive to identify a write strategy for the optical drive that is embedded in the optical medium. A write strategy selection engine compares the built in write strategy with the embedded write strategy to select the write strategy having priority for use in writing the information to the optical medium. For instance, time stamps associated with the built in and embedded write strategies are compared to select the most recent write strategy. If the embedded write strategy supersedes the write strategy existing on the optical drive, the embedded write strategy is saved to the optical drive for use in subsequent writes of information by the optical drive to optical media having the optical medium's identification code. In one embodiment, a host write strategy table interacts with the optical drive to save embedded write strategies to the host for use by the optical drive without a reflash of the optical drive firmware. The embedded optical medium write strategy table is stored in a permanent reserved area of the optical medium, such as by stamping the data in grooves, stamping the data in pits or writing the data at manufacture of the optical medium.

The present invention provides a number of important technical advantages. One example of an important technical advantage is that an optical drive automatically obtains a write strategy for an optical drive to write information to an optical medium by retrieving the write strategy from the optical medium. Embedding a write strategy table on an optical medium with a list of optical drives each having an associated write strategy provides a convenient and cost effective method for ensuring that optical drives have relevant write strategies readily available for writing information to the optical medium. The use of a write strategy designed for writing information from a particular optical drive to a particular optical medium reduces write errors and improves write speeds.

Another example of an important technical advantage of the present invention is that an optical drive supports write strategies not found in optical drive firmware and updates its internal write strategy list in its non-volatile memory by obtaining a write strategy from an optical medium. Write strategies stored on an optical medium are compared with write strategies existing on the optical drive to select the more current of the existing or embedded write strategy. If an embedded write strategy supersedes an existing write strategy, the embedded write strategy replaces the existing write strategy for use in subsequent writes by the optical drive to similar optical media.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An optical drive writes information to an optical medium by obtaining a write strategy for writing the information from a write strategy table embedded on the optical medium. Embedding a write strategy table on an optical medium to identify write strategies for plural types of optical drives aids in seamless storage of information from an information handling system to an optical medium regardless of the type of drive used by the information handling system. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
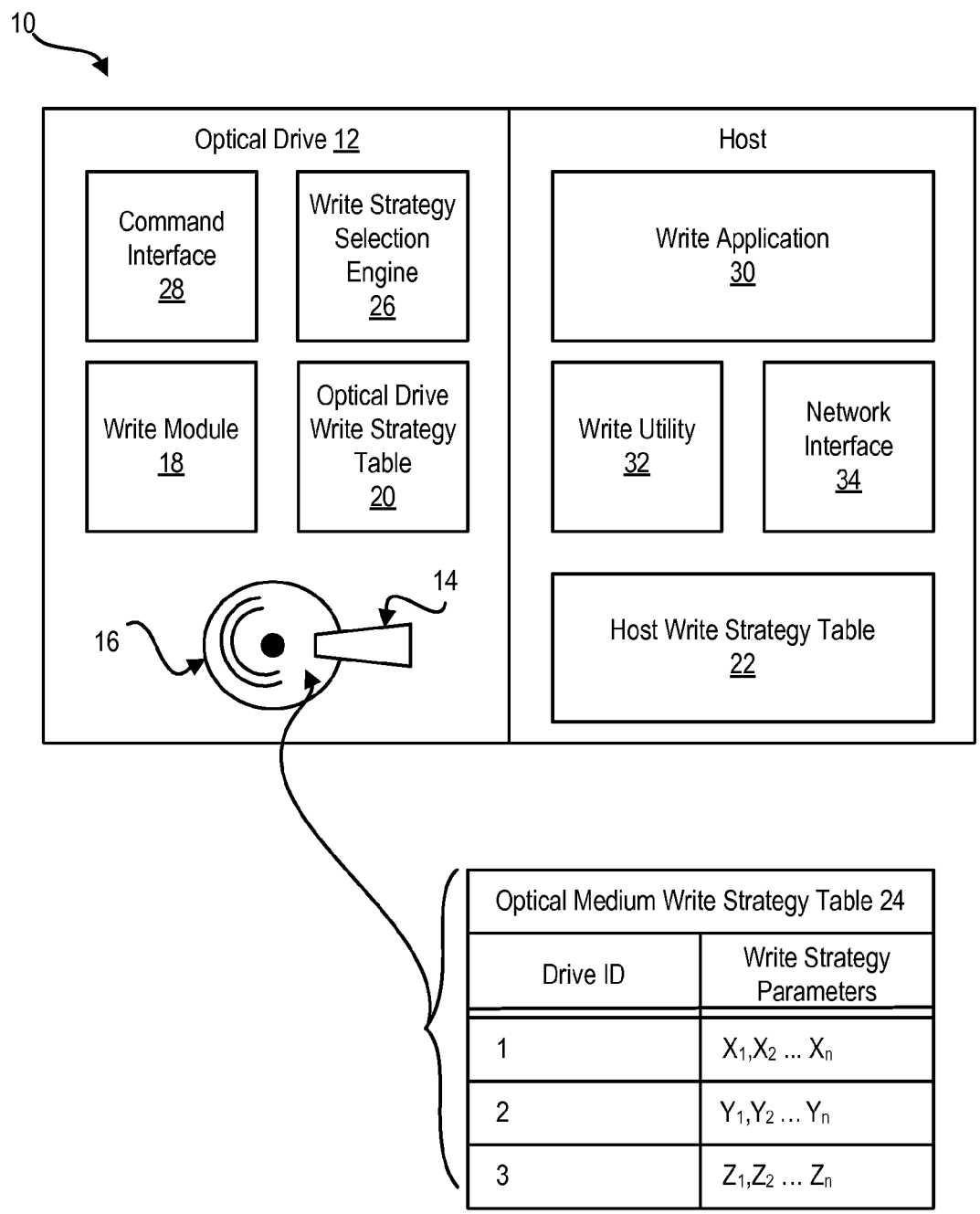
FIG. 1 depicts a block diagram of a system for embedded optical drive write strategies.

Referring now to FIG. 1, a block diagram depicts a system for writing information to an optical medium with an optical drive write strategy embedded on the optical medium. A host information handling system 10 interfaces with and supports the operation of an optical drive 12 having a laser operable to read information from and write information to an optical medium disk 16, such as a CD-R, CD-RW, DVD-R, DVD+RW or DVD-RAM disk. Host information handling system 10 generates information to write to optical medium disk 16 by running applications with components such as the CPU. Optical drive 12 and optical medium 16 each have an identification code or other identification indicia created by its manufacturer to identify the type of drive or medium. For instance, manufacturers typically store model numbers in firmware of optical drive 12 and typically embed a medium identification code in a non-user accessible area of optical medium 16. The optical drive and optical medium identification code uniquely identifies the optical drive and optical medium type. Manufacturers of optical drives and media formulate a write strategy for each type of optical drive to write information to each type of optical medium. For instance, the write strategy defines the pulse power, shape, width and other parameters used by laser 14 to write information to optical medium disk 16.

A write module 18 of optical drive 12 interacts with an optical medium 16 inserted in optical drive 12 to select a write strategy for writing information to the optical medium. Write module 18 identifies the type of inserted optical medium 16 by reading embedded identification code or other identification indicia from optical medium 16 and obtains a write strategy for the optical medium by looking up the identification code in an optical drive write strategy table 20. Optical drive write strategy table 20 stores in optical drive non-volatile memory plural write strategies for different types of optical media cross referenced by the optical medium identification code or other identification indicia and a time stamp. Write module 18 also queries an optical medium write strategy table 24 embedded in optical medium 16 with the optical drive identification code to identify a write strategy for writing information from optical drive 12 to optical medium 16. Optical medium write strategy table 24 lists optical drive identification codes and associates each optical drive identification code with a write strategy and time stamp. For instance, at manufacture of optical medium 16, optical medium write strategy table 24 is populated with the known write strategies for known optical drive types and is stamped in grooves, stamped in pits or written as data into the optically reactive material of the optical medium, such as in a section or subcode reserved for the table.

A write strategy selection engine 26 interfaces with write module 18 to select either the write strategy from optical drive write strategy table 20 or optical medium write strategy 24 for writing information to optical medium 16. For instance, the date stamps associated with the write strategies are compared to determine which write strategy is most current and the most current write strategy is used by write module 18 to write the information. In one embodiment, if the write strategy retrieved from optical medium write strategy table 24 supersedes the write strategy of optical drive write strategy table 20, then write strategy selection engine 26 optionally updates optical drive write strategy table 20 with the more current write strategy for the media type. In one embodiment, write strategy selection engine 26 communicates through a command interface 28 to host information handling system 10 to coordinate requests for write strategies with a host write strategy table 22. Write application 30 or write utility 32 queries host write strategy table 22 for the optical medium identification code read from optical medium disk 16 by write module 18 to ensure that optical drive write strategy table 20 is up to date. Host write strategy table 22 acts as a proxy for optical write strategy table 20 so that updated write strategies retrieved from optical medium 16 may be used without an immediate reprogramming of the optical drive write strategy drive table 20. If optical drive write strategy table 20, host write strategy table 22 and optical medium write strategy table 24 each lack a write strategy that matches the optical medium and optical drive, write strategy selection engine 26 resorts to a generic write strategy to write the information, such as a generic strategy available in optical drive write strategy table 20.

Figure 2:
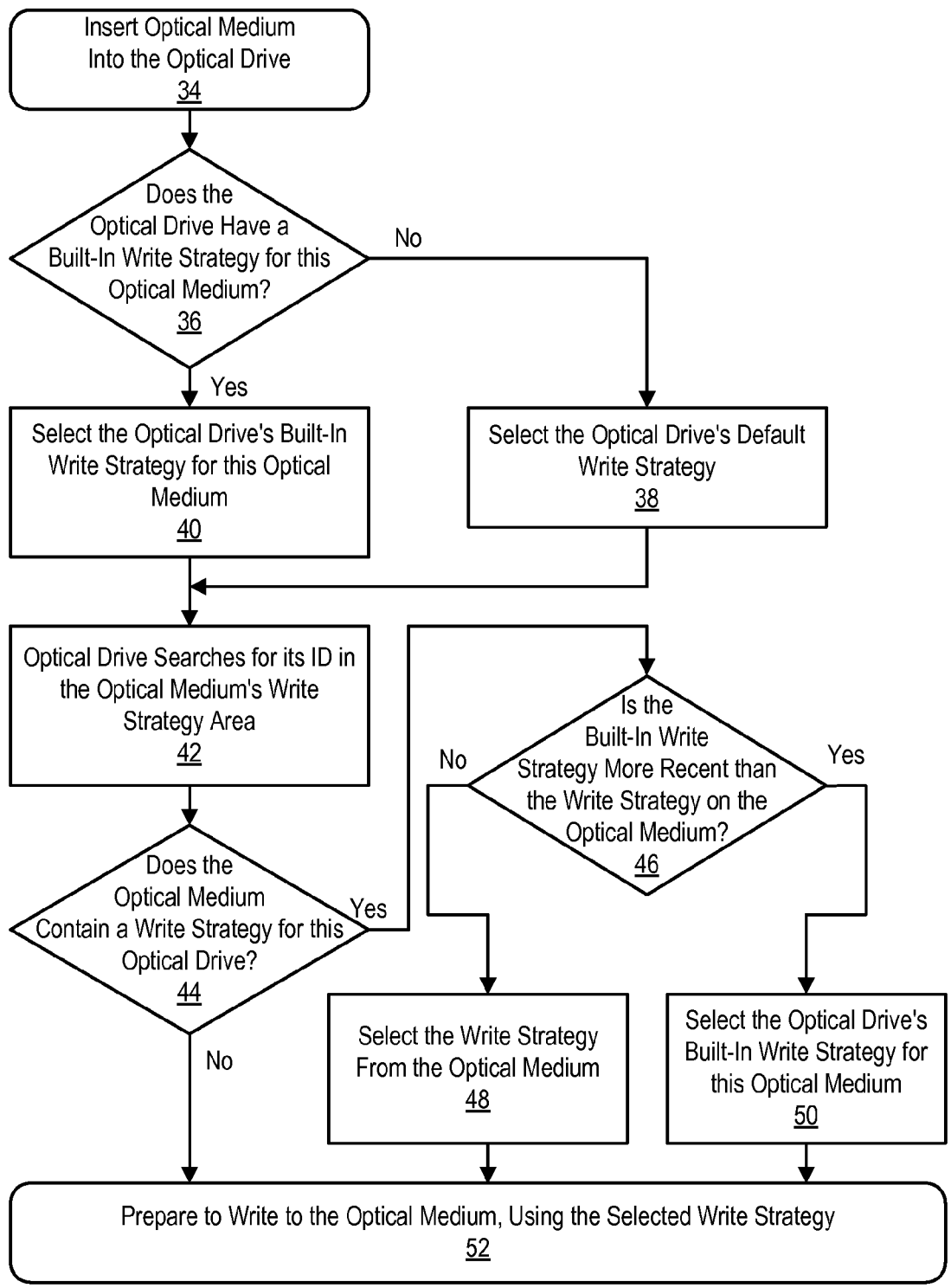
FIG. 2 depicts a process for selecting embedded or existing optical drive write strategies to write information to an optical medium.

Referring now to FIG. 2, a flow diagram depicts a process for selecting a write strategy embedded in an optical medium to write information to the optical medium. The process begins at step 34 with insertion of an optical medium into an optical drive. At step 36, the optical drive detects that the optical medium is a writable optical medium and reads the optical medium identification code to determine whether the optical drive has a built-in write strategy for the optical medium, such as a write strategy associated with the optical medium identification in the optical drive write strategy table 20 or host write strategy table 22. If no write strategy is found on the optical drive, the process continues to step 38 for selection of the optical drive's write strategy. If a write strategy is found, then at step 40 the built-in write strategy associated with the optical medium is selected. At step 42, the optical drive searches the optical medium in the write strategy storage area to locate the identification code associated with the optical medium. At step 44, the optical drive determines if a write strategy is available in the optical medium write strategy table 24 for the optical drive type based on the search for the optical drive identification code. If a write strategy is not available at step 44, the process continues to step 52 for a write of the information to the optical medium with either the built in or the generic write strategy.

If the determination at step 44 is yes, i.e., that a write strategy is available on the optical medium for the optical drive type associated with the identification code, then the process continues to step 46 for selection of the write strategy for use in writing the information. The write strategy identified from the optical medium and its time stamp are retrieved to the optical drive for a determination of whether the built-in or retrieved write strategy should take priority. If the built in write strategy has a time stamp that is more recent that the retrieved write strategy time stamp, the process continues to step 50 for selection of the built in write strategy. If the built in write strategy has a time stamp that is not more recent than the retrieved write strategy time stamp, the process continues to step 48 for selection of the retrieved write strategy. If the retrieved write strategy supersedes the optical drive's existing write strategy, the retrieved write strategy is optionally saved to the optical drive to replace the existing write strategy for use in subsequent writes to optical medium having the same optical medium identification code. At step 52, the information is written to the optical medium with the selected write strategy.

Although the present invention has been described in detail, it should be understood that various changes, substitutions and alterations can be made hereto without departing from the spirit and scope of the invention as defined by the appended claims.

What is claimed is:

1. A method for selecting an optical drive write strategy to write information from an optical drive to an optical medium, the method comprising:
    identifying a write strategy stored on the optical medium that is associated with the optical drive;
    comparing a time stamp associated with the identified write strategy and a time stamp associated with a write strategy stored on the optical drive to determine which write strategy is more recent;
    retrieving the more recent write strategy to the optical drive; and
    using the retrieved write strategy to write the information to the optical medium with the optical drive.

2. The method of claim 1 further comprising storing the identified write strategy in a write strategy table of the optical drive.

3. The method of claim 1, further comprising: writing the information with the write strategy stored on the optical drive when the comparing determines that the write strategy stored on the optical drive is more recent.

4. The method of claim 1 further comprising:
    storing plural write strategies on the optical medium; and
    associating each write strategy with one or more optical drives.

5. The method of claim 4 wherein storing plural write strategies farther comprises stamping the write strategies into the optical medium during manufacture of the optical medium.

6. The method of claim 1, further comprising: writing the information with the write strategy stored on the optical medium when the comparing determines that the write strategy stored on the optical medium is more recent.

* * * * *